United States Patent [19]

Lindner

[11] 4,129,797

[45] Dec. 12, 1978

[54] BRAKE DEVICE FOR DRIVE MOTORS

[75] Inventor: Adolf Lindner, Rottendorf, Germany

[73] Assignee: Siemens Aktiengesellschaft, Berlin and Munich, Germany

[21] Appl. No.: 809,396

[22] Filed: Jun. 23, 1977

[30] Foreign Application Priority Data

Jun. 30, 1976 [DE] Fed. Rep. of Germany ....... 2629439

[51] Int. Cl.² .......................................... H02K 7/102
[52] U.S. Cl. ............................. 310/77; 188/218 XL
[58] Field of Search ............. 188/18 A, 71.1, 218 XL;
192/70.13; 310/77, 76, 75

[56] References Cited

U.S. PATENT DOCUMENTS

| 1,639,038 | 8/1927 | Jobst | 310/77 X |
|---|---|---|---|
| 2,359,516 | 10/1944 | Frank | 188/18 A |
| 2,685,043 | 7/1954 | Durant | 310/77 |
| 2,879,417 | 3/1959 | Sorchy | 310/77 |
| 3,110,830 | 11/1963 | Smith | 310/77 |
| 3,393,776 | 7/1968 | Ludwig | 188/218 XL |

*Primary Examiner*—Donovan F. Duggan
*Attorney, Agent, or Firm*—Kenyon & Kenyon, Reilly, Carr & Chapin

[57] ABSTRACT

A brake for drive motors wherein a brake disk is adapted to be pressed against a stationary brake lining which is provided with a bead-like rim and which is held elastically both radially and axially via a molded rubber member having a profile which bears a mating relationship to the bead-like rim, thereby permitting the brake lining to be held by the member detentably in the manner of a snap connection. The brake is further provided with a brake disk ring which is firmly connected to the molded rubber member and which is adapted to be connected to a stationary member.

9 Claims, 5 Drawing Figures

BRAKE DEVICE FOR DRIVE MOTORS

BACKGROUND OF THE INVENTION

1. Field of the Invention

The invention relates to a brake for use with a drive motor and in particular to a brake comprising a brake lining and a brake disk, the latter being adapted to be spring-lifted electromagnetically by an axial displacement of the rotor of the motor against the force of a spring when the motor winding is energized and to come into contact with the brake lining by the force of the spring when the motor is deenergized.

2. Description of the Prior Art

A brake of the above type is already known wherein the brake lining and brake disk have mutual contact surfaces arranged in the manner of a conical brake at an oblique angle to the rotor displacement and the action line of the spring force and wherein the brake is further provided with a means in the form of an intermediary member and a brake disk ring which is adapted to connect, at least resiliently in the radial direction, the brake lining to a stationary member. In this brake configuration, the brake disk ring is provided around its circumference with radial projections, over which are placed molded rubber members in the form of pockets which serve as the elastic intermediate member and which are adapted to be placed into corresponding depressions in the stationary member. In this manner, the brake lining is adapted to be connected, in at least a radially resilient manner, and, therefore, in a self-adjusting manner, to the aforesaid stationary member.

It is an object of the present invention to provide an improved brake of the above type requiring fewer parts and capable of being built smaller in size.

SUMMARY OF THE INVENTION

In accordance with the principles of the present invention the above and other objectives are accomplished in a brake of the above type by forming the brake lining so as to have a formed-on bead-like rim and by forming the elastic intermediate member as a molded rubber member having a profile which bears a mating relationship to the aforesaid bead-like rim so as to permit the lining to be held by the molded rubber member detentably and elastically in the radial direction in the manner of a snap connection. Additionally, provision is made for firmly connecting the molded rubber member to the brake disk ring which, in turn, is adapted to be connected to a stationary member.

Advantageously, therefore, with the brake of the present invention configured as aforesaid, the brake lining is held radially under pretension by the molded rubber member in such a manner that the braking torque can be transmitted between the brake lining and the molded rubber member or the brake disk ring by friction only. In the embodiment to be described hereinafter, the molded rubber member is provided at its axial end facing away from the brake disk ring with a rim designed in bell-fashion and having an undercut or groove. In this manner, the bead-like rim of the brake lining can be pushed axially into the molded rubber member such that the rim snaps-in behind the undercut in the manner of a pressed fit.

It is also advantageous in the brake of the present invention to secure the molded rubber member to the brake disk ring by vulcanizing and to adapt the brake disk ring to be able to be connected to the stationary member either by a tensional connection as, for example, particularly a press fit, or by a form-locking connection as, for example, wedging. If particularly large braking torques are to be transmitted, it may be further advantageous to additionally provide the molded rubber member with radial projections which are adapted to engage pocket-like depressions of the stationary member in the manner of a tangential form-locking safety mechanism.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
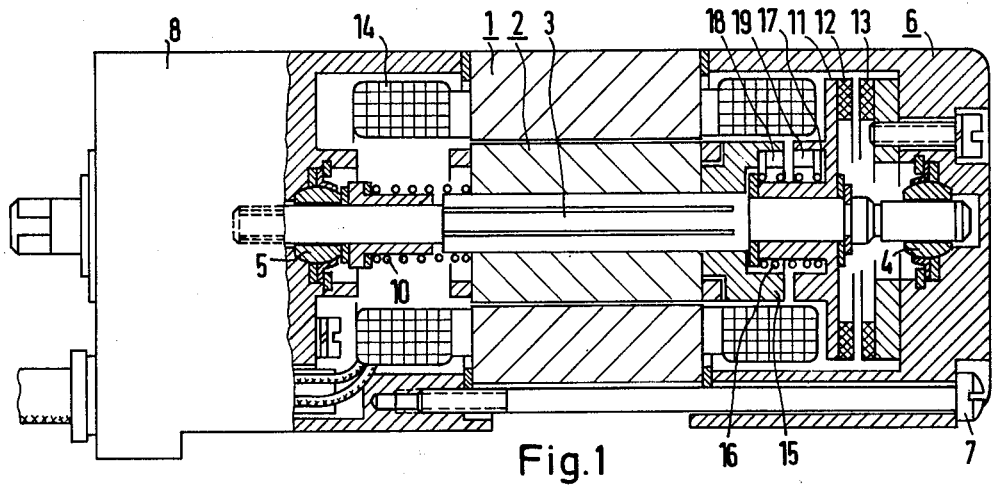
FIG. 1 shows a cross-sectional view of a prior art braking device employing a prior art brake having brake linings arranged at right angles to the rotor displacement.

FIG. 1 shows a prior art drive motor for use in a shutter drive. As shown, the drive motor comprises a stator 1 and a rotor 2. The rotor 2 has a shaft 3 which is rotatably supported in bearings 4 and 5 and which can be shifted or displaced in the axial direction due to the action of the electromagnetic force between the excited stator 1 and the rotor 2. The bearing 4 is held in a hood-shaped end bell 6, which is secured on one side, via screws 7, to a housing 8 of a transmission which has not been shown in detail.

Fastened on the shaft 3 between the bearing 5 and the end face of the rotor 2 is a sleeve 9 having a stop which abuts against the bearing. The sleeve 9 lies in the empty space formed by the coil heads of the winding 14 of the stator 1. Against the end of the stop facing the stator 2 rests one end of an axial spring 10 which is placed over the shaft 3 and lies in part on the sleeve 9. The spring 10 causes the rotor to shift axially if the motor is deenergized and is braced with its other end against the end face of the rotor 2. If the winding 14 is deenergized, the rotor is moved a short distance to the right out of the stator bore under the action of the axial spring force of the axial spring 10. This axial movement continues until the brake lining 12 of the brake disk 11 located at the other end face of the rotor comes in engagement with and is pushed against the counter brake lining 13, which is fastened to the hood-shaped end bell 6.

The brake disk 11 is connected to an end of a second spring 16 which acts as a torsion spring. The other end of the spring 16 is fastened to a drive sleeve 15 which in turn, rests against the end face of the rotor 2 which faces the bearing 4 and is connected to the rotor shaft 3. The torsion spring 16 is fastened to the shaft 3 by providing axial slots 19 and 18 in the cylindrical extension 17 of the brake disk 11 and in the sleeve 5 for suitably engaging bent ends of the torsion spring.

Figure 2:
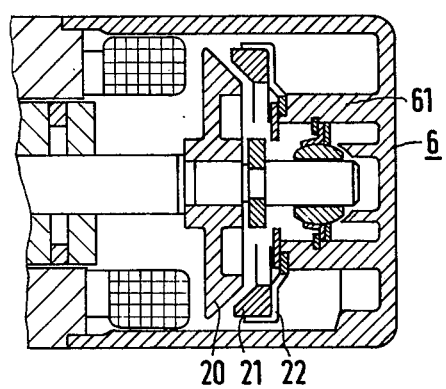
FIG. 2 shows a partial view of the brake of FIG. 1 with its brake linings modified so as to be at an oblique angle to the rotor displacement.

FIG. 2 shows a modified prior art configuration of the brake of FIG. 1 wherein the brake disk 20 carries no brake lining and the contact surfaces of the brake disk 20 and the brake lining 21 are arranged in the manner of a conical brake at an oblique angle to the rotor displacement and the action line of the axial spring 10. The brake lining 21 is further connected to the end bell 6 via pockets of damping material acting as elastic intermediate members. More particularly, the brake lining 21 is held by a brake disk ring 22 which has radial projections which are distributed over its circumference and which are inserted into depressions in the end bell 6. To obtain damping and for at least radial resiliency, molded rubber parts in the form of pockets are placed over the aforesaid radial projections.

Figure 3:
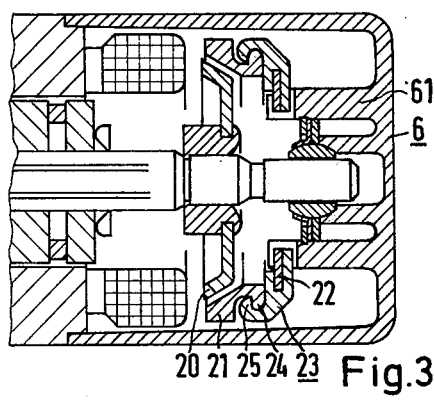
FIG. 3 shows the brake of FIG. 2 modified in accordance with the principles of the present invention.

FIG. 3 illustrates the brake of FIG. 2 modified in accordance with the principles of the present invention. More particularly, in accordance with the invention, the stationary brake lining 21 is held at the brake disk ring 22 via a molded rubber member 23. Specifically, the stationary brake lining 21 is provided with a bead-like rim 24 and the molded rubber member 23 at its end facing toward the rim 24 and away from the brake disk ring 22, with a bell-shaped rim 25 having an undercut or groove capable of mating with the rim 24. The brake lining 21 is thus secured to the member 23 by pushing its bead-like rim 24 into the undercut of the rim 25. In this manner, the bead-like rim 24 snaps-in behind the undercut of rim 25 like a press fit mounting. Preferably, the molded member 23 should be vulcanized to the brake disk ring 22.

As can be appreciated, with the arrangement of the brake lining 21 as in FIG. 3, the lining is held elastically in the radial and axial directions in a particularly simple manner of a detentable snap connection. As a result, the braking torque of the motor can be transmitted without cement bonding or forming a locking connection by utilizing the friction between the brake cone and the molded elastic member arranged in a simple assembly.

Figure 5:
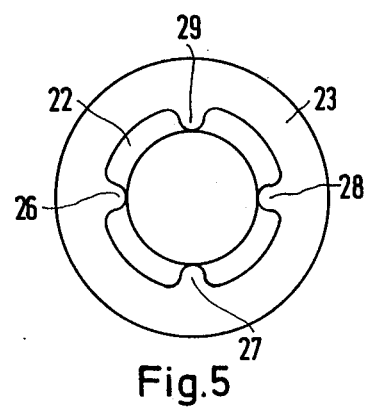
FIG. 5 shows a top view of a portion of the brake of FIG. 3.

The brake disk ring 22, to which the molded rubber member 23 is vulcanized, is wedged at its inner surface into an axially protruding part 61 of the end bell 6 and, thus connected substantially in a form-locking manner. As shown in FIG. 5, for transmitting particularly large braking torques, it may be advantageous to provide on the molded rubber member 23 radial projections 26 to 29. These projections can be distributed around the circumference of the member and can be placed, when the brake is assembled, into corresponding pocket-like depressions of the end bell part 61 to provide an additional, tangential, form-locking safety device.

Figure 4:
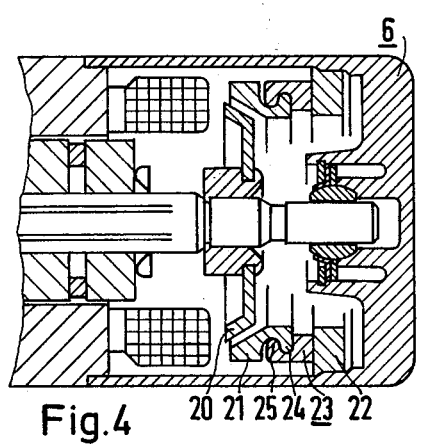
FIG. 4 shows a modified form of the brake of FIG. 3.

FIG. 4 shows a modification of the embodiment of the invention in FIG. 3 wherein a tensional connection is provided between the brake disk ring 22 and the end bell 6. In particular, in this embodiment the outer circumferential surface of the brake disk ring 22 rests firmly against the inner surface of the end bell 6 in the form of a press fit.

What is claimed is:

1. In a brake for use with a drive motor, the brake comprising: a brake lining; a brake disk adpated to be spring-lifted electromagnetically by an axial displacement of the rotor of the motor against the force of a spring when the motor winding is energized and to come into contact by the force of the spring with said brake lining when the motor winding is deenergized; said brake lining and brake disk having mutual contact surfaces arranged in the manner of a conical brake at an oblique angle to the rotor displacement and the action line of the spring force; means adapted to connect at least resiliently in the radial direction said brake lining to a stationary member including an elastic intermediate member and a brake disk ring; the improvement comprising:

said brake lining having a formed-on bead-like rim;
said intermediate member being formed as a molded rubber member having a profile which bears a mating relationship to said rim;
said brake lining being held via said rim in said rubber member detentably and elastically in the radial and axial direction in the manner of a snap connection;
and said rubber member being connected firmly to said brake disk ring.

2. In a brake according to claim 1, the improvement wherein:

said brake lining is held under pretension by said rubber member such that the braking torque can be transmitted between said brake lining and one of said rubber member and said brake disk ring by friction only.

3. In a brake according to claim 1, the improvement wherein:

said rubber member is vulcanized to said brake disk ring.

4. In a brake in accordance with claim 1, the improvement wherein:

said brake disk ring is adapted to be connected to said stationary member tensionally.

5. In a brake in accordance with claim 4, the improvement wherein said tensional connection of said brake lining to said stationary member is in the manner of a press fit.

6. In a brake in accordance with claim 1, the improvement wherein:

said brake disk ring is adapted to be connected to said stationary member in a form locking manner.

7. In a brake in accordance with claim 6, the improvement wherein:

said form-locking connection of said brake disk ring to said stationary member is by wedging.

8. In a brake disk in accordance with claim 1, the improvement wherein:

said molded rubber member has at its end facing away from said brake disk ring a bell shaped rim formed with an undercut;
and said bead-shaped rim of said brake lining is held within said undercut.

9. In a brake in accordance with claim 1, the improvement wherein:

said molded rubber member has radial projections extending from its surface facing toward said brake disk ring and adapted to enter into pocket like depressions in said stationary member.

* * * * *